(12) United States Patent
Weatherby et al.

(10) Patent No.: US 7,306,693 B2
(45) Date of Patent: Dec. 11, 2007

(54) LINING DUCTS

(75) Inventors: Nicholas Leo Weatherby, Nottingham (GB); Matthew Richard Turner, Nottingham (GB)

(73) Assignees: Severn Trent Water Limited, Birmingham (GB); Yorkshire Water Services Limited, Bradford (GB); NCC Danmark A/S, Hellerup (DK); Anglian Water Services Limited, Cambridgeshire (GB); Europrojects (LTTC) Limited, Leicestershire (GB)

( * ) Notice: Subject to any disclaimer, the term of this patent is extended or adjusted under 35 U.S.C. 154(b) by 172 days.

(21) Appl. No.: 10/380,370

(22) PCT Filed: Sep. 19, 2001

(86) PCT No.: PCT/GB01/04166

§ 371 (c)(1),
(2), (4) Date: Aug. 13, 2003

(87) PCT Pub. No.: WO02/25156

PCT Pub. Date: Mar. 28, 2002

(65) Prior Publication Data

US 2004/0036202 A1  Feb. 26, 2004

(30) Foreign Application Priority Data

Sep. 19, 2000  (GB) ................. 0022921.1

(51) Int. Cl.
*B32B 37/00*  (2006.01)
*B29C 65/00*  (2006.01)
*F16L 55/18*  (2006.01)

(52) U.S. Cl. .................. 156/293; 156/294; 156/423; 138/97

(58) Field of Classification Search .................. None
See application file for complete search history.

(56) References Cited

FOREIGN PATENT DOCUMENTS

| JP | 01016632 | * | 1/1989 |
| JP | 01154729 | * | 6/1989 |
| JP | 07171893 | * | 7/1995 |
| WO | WO 98/26919 | * | 6/1998 |

* cited by examiner

*Primary Examiner*—Justin R. Fischer
(74) *Attorney, Agent, or Firm*—Schweitzer Cornman Gross & Bondell LLP

(57) ABSTRACT

Apparatus for converting a flexible liner 2 including a layer 3 of composite material comprising thermoplastics material and reinforcing fibres, into a structural member within a duct 1, has a front portion 6 for insertion in the liner 2, a central portion 7 for heating one side of the layer 3 and a rear portion 20 which forces the heated layer 3 against the duct 1 for consolidation and cooling under pressure. The central portion 7 has heating means 8 producing hot gas which is forced under pressure through the layer 3 of composite material to heat the layer 3, and provides an air gap 14 on the opposite side of the layer 3 while heating takes place. This ensures uniform heating of the layer 3, to melt the thermoplastics material which then mixes intimately with the reinforcing fibres, and is consolidated and cooled to form the structural member.

17 Claims, 3 Drawing Sheets

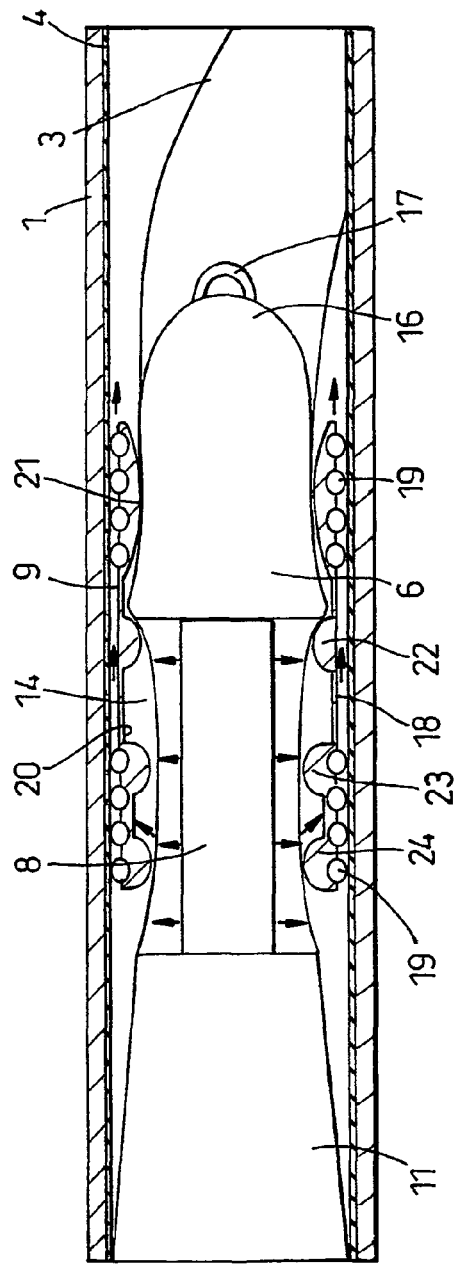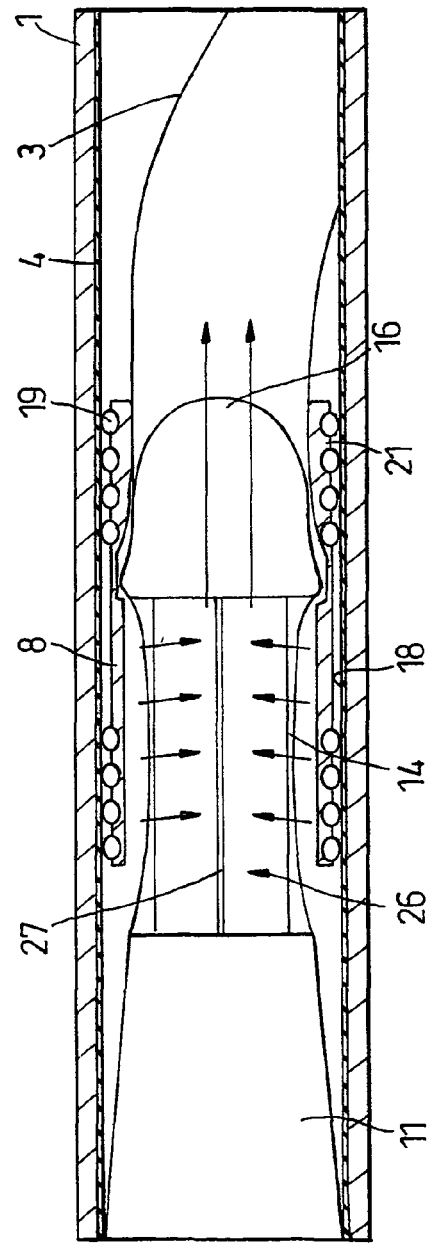

LINING DUCTS

This invention relates to apparatus and a method for lining ducts with fibre-reinforced thermoplastics composite materials.

The term 'duct' as used herein includes pipes, tubes and conduits, whether for conveying fluids (for example, water mains pipes or sewers) or for other purposes.

The ducts used for gas and water supplies are often of cast iron, and failure due to corrosion is becoming an increasing problem as existing systems age. It is, for example, estimated that over half of all water mains in the UK have been in service for more than 40 years, and that 20% have been in service for more than 80 years. Sewer ducts, which are generally of brickwork or concrete, can also fail due to structural deterioration of the materials. It is generally cheaper and causes less disruption if such ducts are rehabilitated by lining rather than removed and replaced. Various different techniques for lining existing ducts are known, but there is a demand for more efficient rehabilitation techniques.

Thus, WO 98/26919 shows a method of lining a duct, using a flexible liner which includes a layer of composite material made of thermoplastics and reinforcing fibres. The liner is introduced into the duct, heated to cause the thermoplastics fibres to melt, and then pressure is applied to mix the molten plastic and reinforcing fibres intimately, and to press the liner into contact with the duct, where it cools and consolidates into a structural member. The heating and application of pressure is performed by a robotic device commonly known as a pig. The pig passes along the inside of the liner, opening it up. The pig has means for heating the liner, and consolidation means which press the heated liner against the duct, where it cools and consolidates. One problem in designing the pig is to ensure that it provides sufficiently uniform heating of the liner to ensure uniformity of the final structural liner member.

DE-A-39 04 524 shows a method of lining a duct using a liner made only of thermoplastics, in this case a non-cross-linked plastics. The liner is introduced into the duct and expanded radially until it comes into contact with the duct, whereupon it becomes rigid and self-supporting. Expansion is preferably performed mechanically, by a pig which rolls in the duct. The liner may be heated to assist expansion, for example by warm air, while there is an air gap between the liner and the duct. However, it is important that the softening temperature of the plastics is not reached. The liner is therefore heated essentially by conduction, as its construction from thermoplastics means that it is relatively easy to control its temperature.

We have found that heating by conduction is not suitable for a liner described in WO 98/26919, which includes a layer of composite material comprising thermoplastics and reinforcing fibres. The composite material has air pockets throughout its thickness, and so cannot be heated uniformly to the melting point of the thermoplastics by conduction.

According to a first aspect of the invention, apparatus for converting a flexible liner, including a layer of composite material comprising thermoplastics material and reinforcing fibres, into a structural member within a duct, comprises a front portion adapted to be inserted in the liner, a central portion having heating means on one side of the layer of composite material, and a rear portion having consolidation means for forcing the heated layer of composite material towards the duct for consolidation and cooling under pressure to form the structural member, characterised in that the heating means produces hot gas which is forced under pressure through the layer of composite material to heat the layer, and the central portion is constructed and arranged to provide an air gap on the opposite side of the layer of composite material while heating takes place.

Providing the air gap on the side (inside or outside) of the layer of composite material opposite the heating means assists in the uniform heating of the layer, as it will not be in contact with the duct or part of the apparatus which can adversely affect heating. The air gap is on the low pressure side of the layer to provide a well-defined exit path for the pressurised hot gas through the thickness of the composite layer. The pressure differential across the layer drives the hot gas through in a uniform manner. The hot gas replaces the air in the pockets in the layer of composite material, and it has been found that this is a major contributory factor in uniform heating of the layer, and therefore of the liner as a whole.

The hot gas may be directed from the air gap forwardly to provide preheating of the liner at the front portion.

The hot gas is preferably produced by heating a supply of compressed air. Unheated compressed air may then conveniently be used as the consolidation means forcing the heated layer of composite material into contact with the duct. The compressed air inflates a flexible bag means which acts on the layer of composite material. The flexible bag means may be attached to the central portion. Alternatively, it may be separate, and be expanded from the rear, unrolling as it does so. This has the advantage of reducing friction between the layer and the bag means.

Preferably the central portion has inner and outer members, one of the inner and outer members having the heating means and the other having support means for providing the air gap.

Conveniently, the inner member has the heating means, so that the layer of composite material is heated from the inside, while the outer member provides the air gap between the outside of the composite material layer and the duct.

In one embodiment the outer member is annular, surrounding and spaced from the inner member, and the layer of composite material is supported between the inner and outer members. In another embodiment the outer member increases in diameter from the front portion to the rear portion, and the layer of composite material is guided on the outside of the outer member. The outer member is preferably frusto-conical. This has the advantage of opening up the liner gradually as it is heated.

In yet another embodiment the outer member comprises a support carriage surrounding and spaced from the inner member. The layer of composite material is again supported between the inner and outer members. The carriage conveniently has external wheels by which it rolls along inside the duct.

Alternatively, the outer member has the heating means, so that the layer of composite material is heated from the outside, and the inner member has the support means providing the air gap between the inside of the layer and the inner member. In this embodiment the outer member may comprise a carriage. The carriage may extend forwardly to surround all or part of the front portion as well.

The liner may include an outer thermoplastics layer between the duct and the layer of composite material.

The apparatus is conveniently moved along the duct by being winched from its front portion. Compressed air and power for the heating means are supplied through lines attached to the apparatus. A mobile unit may conveniently generate the compressed air supply and the power, for example electricity, to operate the apparatus.

According to a second aspect of the invention, a method of lining a duct comprises:

inserting into the duct a flexible liner including a layer of composite material comprising thermoplastics material and reinforcing fibres;

producing hot gas on one side of the layer of composite material and forcing the hot gas under pressure through the layer of composite material while maintaining an air gap on the opposite side of the layer, to melt the thermoplastics material;

applying pressure to the heated layer to force it towards the duct for consolidation; and allowing the liner to cool under pressure whilst in contact with the duct to harden the layer of composite material into a structural member.

Thus, maintaining the air gap on the side (inside or outside) of the layer opposite to that which is being heated assists in the uniform heating of the layer. The hot gas passes through the composite to the air gap, on the low pressure side of the composite layer, and replaces the air in the pockets of the layer, to heat it uniformly.

The hot gas may then be directed from the air gap to provide pre-heating of the liner.

The liner is preferably inserted into the duct in a collapsed configuration and is subsequently expanded.

Subsequent to insertion of the liner into the duct, apparatus according to the first aspect of the invention may be passed through the liner to perform the method.

A third aspect relates to a combination of the apparatus and the liner to provide an efficient rehabilitation technique for lining existing ducts.

According to a third aspect of the invention, in a combination of apparatus and a flexible liner for forming a structural member to line a duct, the liner includes a layer of composite material comprising thermoplastics material and reinforcing fibres, and is adapted for insertion into the duct, and the apparatus has a front portion adapted to be inserted in the liner, a central portion having heating means on one side of the layer of composite material, and a rear portion having consolidation means for forcing the heated layer of composite material towards the duct for consolidation and cooling under pressure to form the structural member, characterised in that the heating means produces hot gas which is forced under pressure through the layer of composite material to heat the layer, the combination being so constructed and arranged that there is an air gap on the opposite side of the layer of composite material while heating takes place.

The apparatus may be in accordance with the first aspect of the invention. The liner preferably comprises the layer of composite material together with an outer layer of thermoplastics material. Any other suitable combination of apparatus and liner could also be used.

As with the first two aspects of invention, it is the provision of pressurised hot gas and the air gap that assists in the uniform heating of the layer of composite material, to improve the effectiveness of the process.

The various aspects of the invention are illustrated, by way of example, in the accompanying drawings, in which:

FIG. 2 shows a longitudinal section through the apparatus of FIG. 1 which has internal heating means for the liner;

FIG. 3 shows a longitudinal section through a modified apparatus with external heating means for the liner;

FIG. 1 illustrates apparatus used for lining an underground duct, in this case a water mains pipe 1, with a liner 2 of fibre-reinforced composite material to form a structural member.

Figure 1:
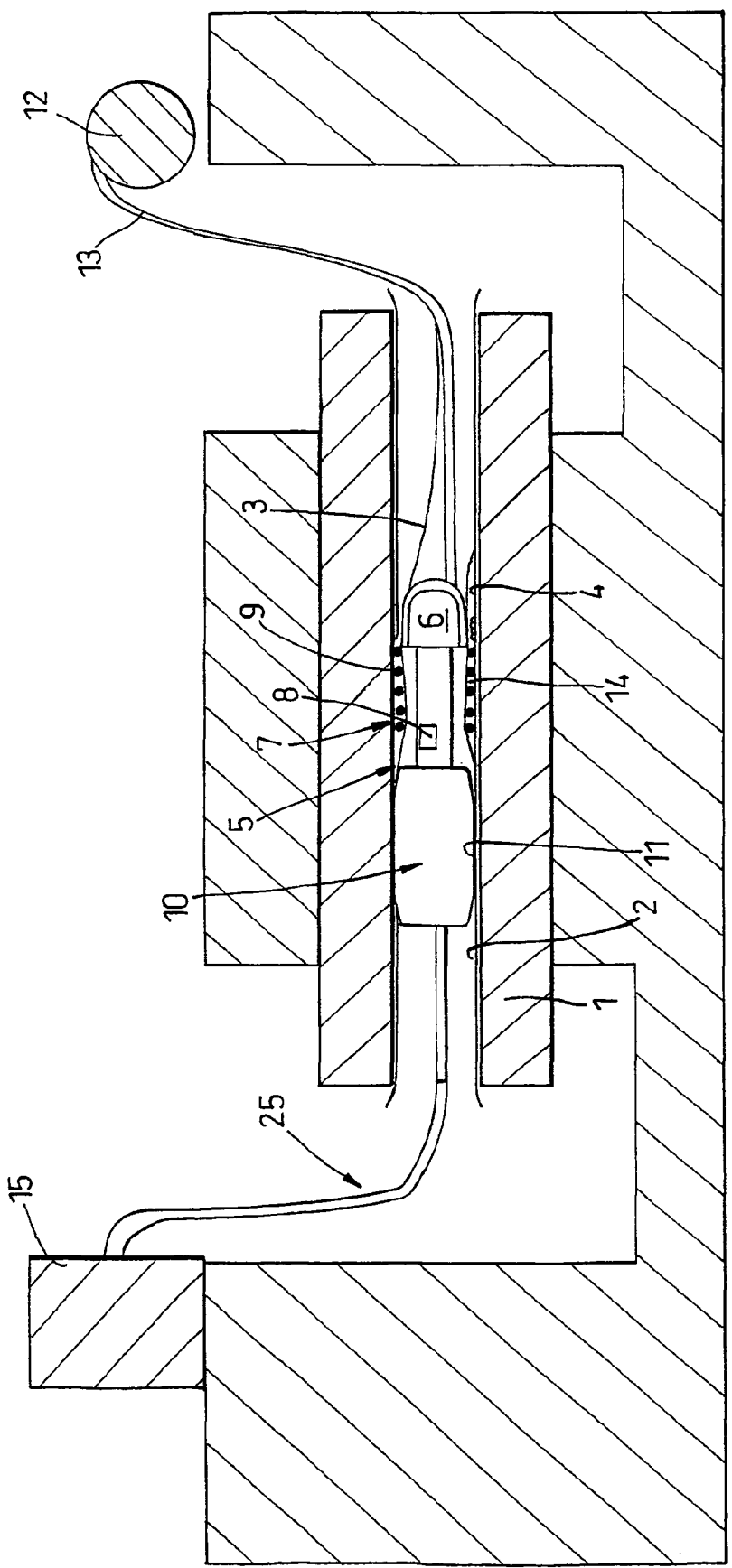
FIG. 1 shows in diagrammatic form the use of apparatus for lining a duct with a liner having a layer of composite material.

The liner 2 is initially flexible and includes an inner layer 3 of composite material comprising filaments of thermoplastic and filaments of reinforcing fibres, and an outer layer 4 of thermoplastics material. Each layer is formed as a tube. The preferred material for the inner layer 3 is one knitted, braided, woven (or otherwise matted together) from tows comprising substantially continuous filaments of a thermoplastic such as polypropylene and similarly continuous reinforcing fibres such as that available from Vetrotex International under the registered trade name TWINTEX. It is also possible to use shorter lengths of fibres connected together in any suitable way. For example, the short fibres may be matted together with a thermoplastic binder, stitched, needle punched or stapled. The inner layer 3 has air pockets between the filaments.

The apparatus comprises a robotic device 5 (commonly known as a pig) which is moved through a section of liner 2 previously inserted into the pipe 1. The device 5 has a front portion 6, a central portion 7 including heating means 8 and support means 9, and a rear portion 10 including consolidation means 11. The device 5 is pulled through the pipe 1 by a winch 12 operating a cable 13 attached to the front portion 6. The heating means 8 comprises an electrical element (or any other suitable heater) which heats compressed air, producing hot gas which is then applied to the inside of the layer 3 to melt the thermoplastic filaments. The support means 9 provide an air gap 14 on the outside of the inner layer 3 between the inner layer 3 and the outer layer 4. The electricity for the heating element 8 and the compressed air are supplied by a generator and compressor respectively formed into a mobile unit 15 which remains above ground, and is connected to the device by an umbilical 25 containing the electricity and air lines. The compressed air is also used for the consolidation means, which comprises a flexible bag 11 inflated by the compressed air, to press the heated inner layer 3 and the outer layer 4 against the internal wall of the pipe 1. On cooling, the liner 2 forms a structural member within the pipe 1. The mobile unit 15 also includes a programmable process control unit to control operation of the various parts. The apparatus shown will normally reline about 100 m of pipe in a single run.

FIG. 2 shows the device 5 and the liner 2 in more detail. When the liner 2 is inserted in the pipe 1, it tends to fold up at the lowest point of the pipe. As the device 5 travels along, the outer layer 4 is first pressed against the pipe, followed by the inner layer 3.

The front portion 6 of the device 5 comprises a rounded nose 16 having an eye 17 to which the winch cable 13 is attached. Movement of the nose 16 opens up the inner layer 3. The heating element 8 is attached to the rear of the nose 16, and is of smaller diameter, so that a gap opens up between the heating element 8 and the inside of the inner layer 3. The hot gas (up to 180° C.) produced by the heating element 8 is under pressure, and is forced through the inner layer 3, by the pressure differential across the inner layer 3, between the higher pressure inside surface and the lower pressure air gap 14 on the outside surface. The hot gas drives out the air in the air pockets, thus heating the layer 3 from the inside. The hot gas reaches the lower pressure air gap 14 on the outside of the inner layer 3. The air gap 14 is provided by the support means 9, which also serves to direct the gas forwardly over the nose 16. The gas, which is still warm, serves to pre-heat the inner and outer layers 3, 4.

The support means 9 comprises a tubular metal carriage 18 surrounding part of the nose 16 and the heating element 8, and arranged between the inner and outer layers. Wheels 19 are mounted around the circumference of the radially outer side of the carriage 18 to roll along in engagement with the pipe and the outer layer 4. The radially inner surface 20 of the carriage 18 is contoured. A forward rounded annular projection 21 fits into a corresponding contour of the nose 16, so that movement of the nose 16 also pulls the carriage 18 along. Further projections 22, 23, 24 are spaced along the heating element 8 to keep the inner layer 3 in the correct place.

At the rear portion 10 the inflatable bag 11, which is for example of silicone rubber, is attached to the rear of the heating element 8. When filled with compressed air at a suitable pressure, the bag 11 forces the hot inner layer 3 against the outer layer 4 and the pipe 1, to consolidate and cool it under pressure to form a structural member.

Thus, in use, the liner 2 is first inserted into the pipe 1, perhaps by winching. The device 5 is then inserted into the liner 2, ensuring that the inner layer 3 is between the nose 16 and the carriage 18, and that the outer layer 4 is radially outside the carriage 18. The device 5 is then operated by the control unit to supply compressed air to the heating element 8, to provide hot gas under pressure to heat the inner layer 3, and then to inflate the bag 11, and operate the winch 12 to pull the device 5 along the pipe 1. The control unit controls the gas temperatures and air pressures, and the velocity of the device.

With the device 5 in an initial position the hot gas directed over the nose 16 preheats an initial portion of the liner 2 and urges the outer layer 4 against the pipe 1. The hot gas also heats the thermoplastics filaments of the inner layer 3 uniformly, because the pressure differential as a result of the air gap 14 drives the hot gas through the thickness of the layer 3, replacing the air in the air pockets with hot gas. The thermoplastics filaments therefore melt and the molten plastics surrounds the reinforcing fibres. The device moves along a predetermined length, whereupon the bag 11 is inflated to press the hot inner layer 3 and the warm outer layer 4 against the pipe 1. The molten plastics of the inner layer 3 mixes intimately with the reinforcing fibres, as part of the consolidation of the layers, which then cool and harden under pressure to form a structural member. While the bag 11 is consolidating the initial portion of the liner, the hot gas is heating the next portion, and so the process continues.

The device provides an efficient way of lining the pipe. FIG. 3 shows a modified device, and corresponding reference numerals have been applied to corresponding parts. Thus, the device 5 of FIG. 3 has the same basic elements as that of FIG. 2, but the heating element 8 is provided on the carriage 18, rather than being attached between the nose 16 and the bag 11. The inner layer 3 is therefore heated from the outside instead of the inside. The support means 9 is then formed by a member 26 attached between the nose 16 and the bag 11. The member 26 comprises longitudinal fins 27, so that the required air gap 14 is provided on the inside of the inner layer 3. The hot gas is directed forwardly through the nose 16 to pre-heat the inner layer 3. Otherwise the embodiment of FIG. 3 operates in the same way as that of FIG. 2.

Figure 4:
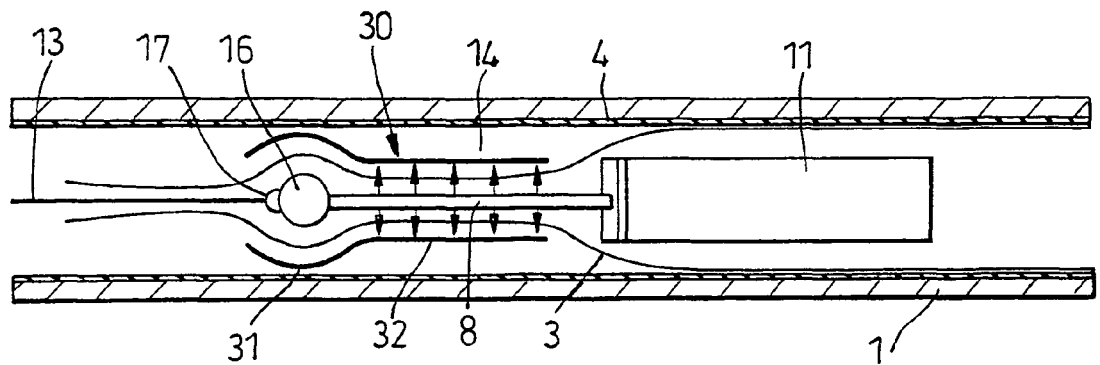
FIG. 4 shows a longitudinal section through a modified apparatus with internal heating means for the liner.

FIG. 4 shows a diagram of a modification of the embodiment of FIG. 2, and corresponding reference numerals have been applied to corresponding parts. In FIG. 4 the heating element 8 is again provided for the inside of the liner 2, and is attached between the nose 16, which is spherical, and the bag 11 (shown uninflated). The support means 9, instead of being a carriage 18, comprises an annular member 30 surrounding the nose 16 and heating element 8, to guide the inner layer 3 and maintain the air gap 14 during heating. The annular member 30 has an enlarged forward end 31 round the spherical nose 16, and a tubular rearward end 32 round the heating element 8. The member 30 may have wheels or rollers (not shown) to reduce friction. Otherwise the construction and operation of the embodiment of FIG. 4 are the same as those of FIG. 2.

Figure 5:
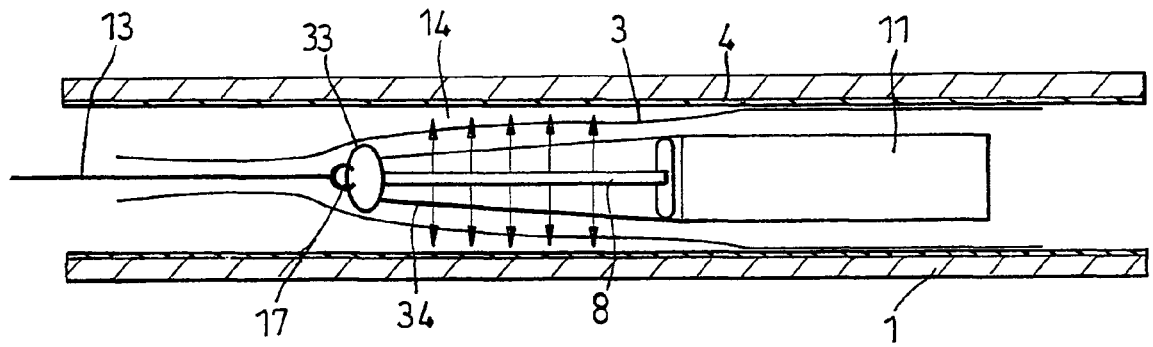
FIG. 5 is similar to FIG. 4, but shows a further modification.

FIG. 5 shows a modification of the embodiment of FIG. 4. In FIG. 5 the front portion 6 of the device comprises a toroidal end cap 33 with the eye 17 to which the winch cable 13 is attached. The heating element 8 extends between the end cap 33 and the bag 11. The support means 9 comprises a perforated frusto-conical member 34 also attached between the cap 33 and the bag 11. The diameter of the member 34 increases from front to rear, and the inner layer 3 is guided along the outer surface of it. It has been found that the member 34 forms a guide for the inner layer 3, ensuring that the air gap 14 is maintained between the inner layer 3 and the pipe 1 during heating. It also opens the inner layer 3 up gradually as it is heated, so that consolidation is more efficient. Otherwise the construction and operation of the embodiment of FIG. 5 are the same as those of FIG. 4.

Figure 6:
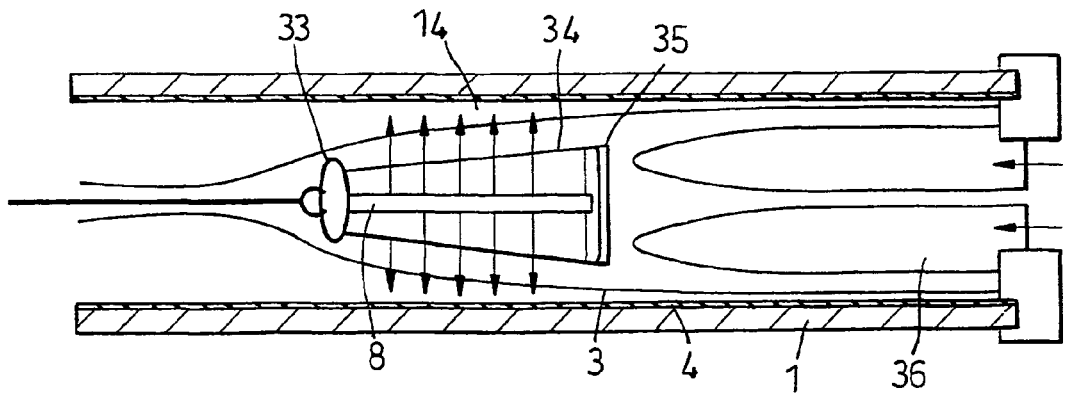
FIG. 6 is similar to FIG. 5, and shows modified consolidation means.

FIG. 6 shows a modification of the embodiment of FIG. 5. In FIG. 6 the front portion 6, and central portion with the heating element 8 and conical member 34 are similar to those of FIG. 5, although the conical member 34 has a rear end cap 35. The rear portion 10, including the consolidation means 11 is modified, as it is not attached to the central portion 7. The consolidation means still has a flexible inflatable bag 36, but this is inflated from its rearward end, and caused to unroll against the liner 2 as the device 5 moves along. The rolling contact between the liner 2 and the bag 36 creates less friction than the sliding contact of FIGS. 2 to 5. It may therefore be possible for the device 5 of FIG. 6 to move continuously rather than in indexed steps as in FIGS. 2 to 5.

The invention claimed is:

1. Liner conversion apparatus adapted to convert a flexible liner, including a layer of composite material, said composite material comprising thermoplastics material and reinforcing fibres, into a structural member within a duct, comprises a front portion, a central portion and a rear portion, said front portion being adapted to be inserted in said liner, said central portion having heating means on one side of said layer of composite material and said rear portion having consolidation means for forcing said heated layer of composite material towards said duct for consolidation and cooling under pressure to form said structural member, wherein said heating means produces pressurised hot gas, said central portion being so constructed and arranged to force said hot gas under pressure through said layer of composite material to heat said layer, and to provide an air gap on the opposite side of said layer of composite material while heating takes place, said central portion having inner and outer members, one of said inner and outer members having said heating means and the other having support means for providing said air gap, said outer member increasing in diameter from said front portion to said rear portion, and, in use, said layer of composite material being guided on the outside of said outer member.

2. Apparatus according to claim 1, wherein said outer member is frusto-conical.

3. Apparatus according to claim 1, wherein said liner includes outer thermoplastics layer between said duct and said layer of composite material.

4. Apparatus according to claim 1, wherein said hot gas is directed from said air gap forwardly to provide pre-heating of said liner at said front portion.

5. Apparatus according to claim 1, wherein said hot gas is produced by heating a supply of compressed air.

6. Apparatus according claim 1, wherein compressed air is used as said consolidation means.

7. Apparatus according to claim 1, wherein said consolidation means comprises a flexible bag means inflatable by compressed air.

8. Apparatus according to claim 7, wherein said flexible bag means is separate from the central portion and, in use, is expanded from said rear, unrolling as it does so.

9. Liner conversion apparatus adapted to convert a flexible liner, including a layer of composite material, said composite material comprising thermoplastics material and reinforcing fibres, into a structural member within a duct, comprises a front portion, a central portion and a rear portion, said front portion being adapted to be inserted in said liner, said central portion having heating means on one side of said layer of composite material and said rear portion having consolidation means for forcing said heated layer of composite material towards said duct for consolidation and cooling under pressure to form said structural member, wherein said heating means produces pressurised hot gas, said central portion being so constructed and arranged to force said hot gas under pressure through said layer of composite material to heat said layer, and to provide an air gap on the opposite side of said layer of composite material while heating takes place, said central portion having inner and outer members, one of said inner and outer members having said heating means and the other having support means for providing said air gap, said outer member comprising a support carriage surrounding and spaced from said inner member.

10. Apparatus according to claim 9, wherein said carriage has external wheels by which it rolls along inside said duct.

11. Apparatus according to claim 9, wherein said carriage extends forwardly to surround all or part of said front portion.

12. A method of lining a duct comprising:
    inserting into the duct a flexible liner including a layer of composite material comprising thermoplastics material and reinforcing fibres which material, at least when heated, is air permeable; producing hot gas on one side of said layer of composite material and forcing said hot gas under pressure through said layer of composite material from said one side thereof to the other side thereof while physically supporting said composite material in spaced relation to said duct to maintain an air gap on the said other side of said layer to receive said hot gas passing through said composite material, to melt said thermoplastics material;
    applying pressure to said heated layer to force it towards said duct for consolidation; and
    allowing said liner to cool under pressure whilst in contact with said duct to harden said layer of composite material into a structural member.

13. A method according to claim 12, wherein said hot gas is directed from said air gap to provide pre-heating of said liner.

14. A method according to claim 12, wherein said liner is inserted into said duct in a collapsed configuration and is subsequently expanded.

15. A method according to claim 12, wherein after insertion of said liner into said duct apparatus as defined in claim 1 is passed through said duct to perform said method.

16. A combination of apparatus and a flexible liner for forming a structural member to line a duct, in which said liner includes a layer of composite material comprising thermoplastics material and reinforcing fibres which material, at least when heated, is air permeable, and is adapted for insertion into said duct, and the apparatus has a front portion, a central portion and a rear portion, said front portion adapted to be inserted in said liner, a central portion having heating means on one side of said layer of composite material, and said rear portion having consolidation means for forcing said heated layer of composite material towards said duct for consolidation and cooling under pressure to form said structural member, wherein said heating means produces hot gas which is forced under pressure through said layer of composite material from said one side thereof to the other side thereof to heat said layer, the central portion having inner and outer members, one of said inner and outer members having said heating means and the other having support means for providing an air gap on the said other side of said layer of composite material to receive said hot gas passing through said composite material while heating takes place.

17. A combination according to claim 16 wherein said liner comprises said layer of composite material together with an outer layer of the thermoplastics material.

* * * * *